(12) United States Patent
Raina

(10) Patent No.: US 11,475,230 B1
(45) Date of Patent: Oct. 18, 2022

(54) GEOFENCE BASED QUICK RESPONSE CODES

(71) Applicant: WARPSPEED, Inc, Pleasanton, CA (US)

(72) Inventor: Abnesh Raina, Pleasanton, CA (US)

(73) Assignee: WARPSPEED, Inc., Pleasanton, CA (US)

(*) Notice: Subject to any disclaimer, the term of this patent is extended or adjusted under 35 U.S.C. 154(b) by 0 days.

(21) Appl. No.: 17/303,470

(22) Filed: May 28, 2021

(51) Int. Cl.
*G06K 7/14* (2006.01)
*H04W 4/021* (2018.01)

(52) U.S. Cl.
CPC .......... *G06K 7/1417* (2013.01); *H04W 4/021* (2013.01)

(58) Field of Classification Search
CPC ............................ G06K 7/1417; H04W 4/021
USPC ....................................................... 235/462.1
See application file for complete search history.

(56) References Cited

U.S. PATENT DOCUMENTS

| | | | |
|---|---|---|---|
| 8,463,295 B1 * | 6/2013 | Caralis | H04W 4/021 455/456.3 |
| 2018/0350144 A1 * | 12/2018 | Rathod | G06Q 20/3276 |

* cited by examiner

*Primary Examiner* — Toan C Ly
(74) *Attorney, Agent, or Firm* — Schwegman Lundberg & Woessner, P.A.

(57) ABSTRACT

Disclosed are systems, methods, and non-transitory computer-readable media for geofence based QR codes, Geofences are used to define a geographic location-based restriction on the use of QR codes. For example, geofence data embedded in a geofence based QR code defines the boundary of the geographic region in which the QR codes may be accessed. When a geofence based QR code is scanned, the geofence data is extracted and compared to a current geographic location of the client device used to scan the geofence based QR code, if the location of the client device is within the geographic boundary defined by the geofence, the digital content item associated with the geofence based QR code is presented on the display of the client device. Alternatively, the digital content item is not presented if the location of the client device is not within the geographic boundary.

20 Claims, 10 Drawing Sheets

GEOFENCE BASED QUICK RESPONSE CODES

TECHNICAL FIELD

An embodiment of the present subject matter relates generally to Quick Response (QR) Codes, more specifically, to geofencing capabilities to QR codes.

BACKGROUND

QR Codes are used to distribute digital content to users. For example, QR code are generally embedded with a content link that allows for the access of the digital content. A user can use a client device to scan the QR code and retrieve the embedded content link, which may then be used to access the digital content. The use of QR codes is advantageous as it allows for content to be distributed in a digital, rather than physical format, thereby eliminating the need to create physical copies of the content. Further, the content can be continuously modified or updated as the content link embedded in the QR code points to the location of the content.

Distributing content using QR codes has some drawbacks. For example, distributing content with QR codes limits the ability to control access to the content. Unlike physical copies of content that are limited in number and may be easily tracked, digital copies of content may be accessed repeatedly through use of the QR code. This lack of control may become particularly troublesome when dealing with confidential content and/or content including personally identifying information. Accordingly, improvements are needed.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, various details are set forth in order to provide a thorough understanding of some example embodiments. It will be apparent, however, to one skilled in the art, that the present subject matter may be practiced without these specific details, or with slight alterations.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Disclosed are systems, methods, and non-transitory computer-readable media for geofence based QR codes. Geofences can be used to restrict the use of geofence based QR codes to desired geographic locations. For example, a QR code management system allows for a geographic region to be defined for limiting the use of a geofence based QR code. The QR code management system embeds geofence data defining the boundary of geographic region into the QR code along with a content link for accessing content associated with the QR code.

When the QR code is scanned using a client device (e.g. phone, tablet, etc.), the geofence data and content link embedded in the QR code are extracted. The location of the client device is used to determine whether the client device is within the geographic region defined by the geofence data. If the client device is determined to be within the geographic region, the content link extracted from the QR code is presented on a display of the client device, thereby allowing a user to access the corresponding content. Alternatively, if the client device is determined to be outside of the geographic region, the content link is not presented on the display and, optionally, an error may be presented. This allows for use of a geofence based QR code to be restricted to a desired geographic location.

Figure 1:
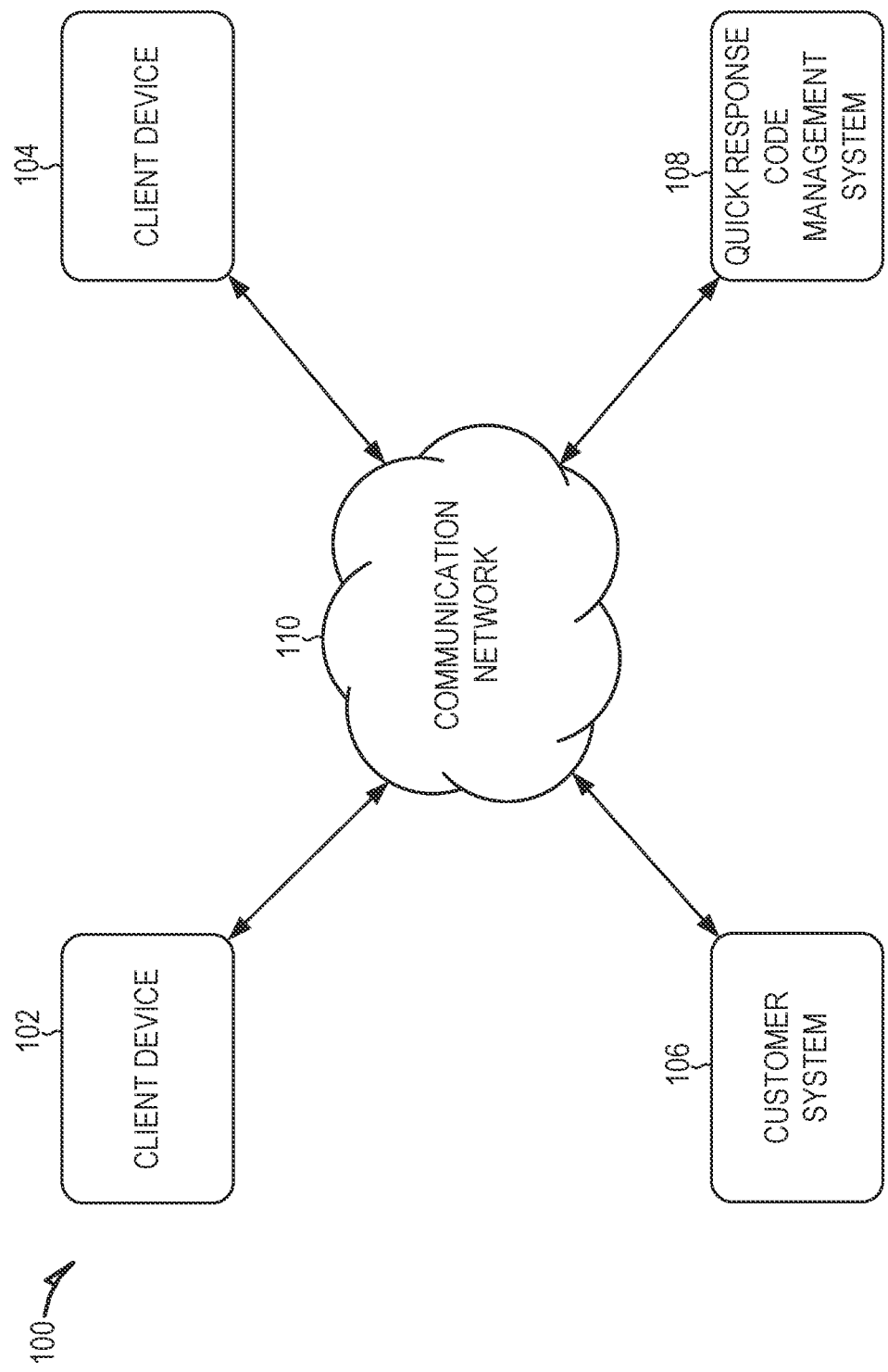
FIG. 1 shows a system for geofence based QR codes, according to some example embodiments.

FIG. 1 shows a system 100 for geofence based QR codes, according to some example embodiments. As shown, multiple devices (i.e., client device 102, client device 104, customer system 106, and QR code management system 108) are connected to a communication network 110 and configured to communicate with each other through use of the communication network 110. The communication network 110 is any type of network, including a local area network (LAN), such as an intranet, a wide area network (WAN), such as the internet, a telephone and mobile device network, such as cellular network, or any combination thereof. Further, the communication network 110 may be a public network, a private network, or a combination thereof. The communication network 110 is implemented using any number of communication links associated with one or more customers, including one or more wired communication links, one or more wireless communication links, or any combination thereof. Additionally, the communication network 110 is configured to support the transmission of data formatted using any number of protocols.

Multiple computing devices can be connected to the communication network 110. A computing device is any type of general computing device capable of network communication with other computing devices. For example, a computing device can be a personal computing device such as a desktop or workstation, a business server, or a portable computing device, such as a laptop, smart phone, or a tablet personal computer (PC). A computing device can include some or all of the features, components, and peripherals of the machine 1000 shown in FIG. 10.

To facilitate communication with other computing devices, a computing device includes a communication interface configured to receive a communication, such as a request, data, and the like, from another computing device in network communication with the computing device and pass the communication along to an appropriate module running on the computing device. The communication interface also sends a communication to another computing device in network communication with the computing device.

The customer system 106 is one or more computing devices associated with a customer of the QR code management system 108. A customer may be a person, business, company, and/or any other type of entity that uses the services provided by the QR code management system 108.

The customer may use the functionality of the QR code management system 108 as part of a service provided by the customer. The customer may provide any type of service, such as a marketing service, a store visits/purchases service, a campaign ROI service, a store performance service, and the like. The service may be an online and/or offline service. That is, the service may be available online, such as via a website of application, offline, such as via a brick-and-mortar store, or a combination of both online and offline.

The customer system 106 may facilitate any service of a customer that is provided online, such as access to an online store, shopping online, online catalogue, online discount service, and the like. In these types of embodiments, users (e.g., customers of the customer) may interact with the customer system 106 to utilize the online service provided by the customer. Users communicate with and utilize the functionality of the customer system 106 by using the client devices 102 and 104 that are connected to the communication network 110 by direct and/or indirect communication. The customer system 106, however, does not have to provide an online service that is accessible to users. That is, the customer system 106 may simply be a computing system used by a customer to perform any type of functionality, such as manage inventory, maintain transaction data, maintain customer records, and the like.

Although the shown system 100 includes only two client devices 102, 104 and one customer system 106, this is only for ease of explanation and is not meant to be limiting. The system 100 can include any number of client devices 102, 104 and/or customer system 106. Further, each customer system 106 may concurrently accept communications from and/or interact with any number of client devices 102, 104, and support connections from a variety of different types of client devices 102, 104, such as desktop computers; mobile computers; mobile communications devices, e.g., mobile phones, smart phones, tablets; smart televisions; set-top boxes; and/or any other network enabled computing devices. Hence, the client devices 102 and 104 may be of varying type, capabilities, operating systems, and so forth.

A user interacts with a customer system 106 via a client-side application installed on the client devices 102 and 104. In some embodiments, the client-side application includes a component specific to the customer system 106. For example, the component may be a stand-alone application, one or more application plug-ins, and/or a browser extension. However, users may also interact with the customer system 106 via a third-party application, such as a web browser or messaging application, that resides on the client devices 102 and 104 and is configured to communicate with the customer system 106. In either case, the client-side application presents a user interface (UI) for the user to interact with the customer system 106. For example, the user interacts with the customer system 106 via a client-side application integrated with the file system or via a webpage displayed using a web browser application.

The QR code management system 108 provides geofence based QR code functionality for customers. A customer may utilize QR codes to distribute digital content. For example, the QR code management system 108 enables customers to generate QR codes that are embedded with content links that allows for the access of specified digital content. The content link identifies a location at which the specified digital content may be accessed. For example, the content link may be a uniform resource identifier (URI) that identifies a location at the customer system 106 at which the digital content is hosted. The customer makes the QR codes available to its users to allow the users to access the digital content. For example, a user can use a client device 102, 104 to scan the QR code and retrieve the embedded content link. A user may then use the retrieved content link to access the digital content with their client device 102, 104. For example, the user may select the content link to cause the client device 102, 104 to initiate a request to the location associated with the content link and retrieve the digital content.

Currently, distributing content using QR codes limits the ability to control access to the content. Unlike physical copies of content that are limited in number and may be easily tracked, digital copies of content may be accessed repeatedly through use of the QR code. This lack of control may become particularly troublesome when dealing with confidential content and/or content including personally identifying information. To alleviate this issue, the QR code management system 108 enables the use of geofences to restrict the use of QR codes to desired geographic locations. For example, a QR code management system 108 enables customers to define a geographic region when generating a geofence based QR code that limits access to QR code. The QR code management system 108 embeds geofence data defining the boundary of the geographic region into the QR code along with the content link for accessing digital content associated with the QR code.

When the QR code is scanned using a client device 102, 104, the geofence data and content link embedded in the QR code are extracted. The location of the client device 102, 104 is used to determine whether the client device 102, 104 is within the geographic region defined by the geofence data.

If the client device 102, 104 is determined to be within the geographic region, the content link extracted from the QR code is presented on a display of the client device 102, 104 thereby allowing a user to access the corresponding content. Alternatively, if the client device 102, 104 is determined to be outside of the geographic region, the content link is not presented on the display and, optionally, an error may be presented. This allows for use of a geofence based QR code to be restricted to a desired geographic location.

Figure 2:
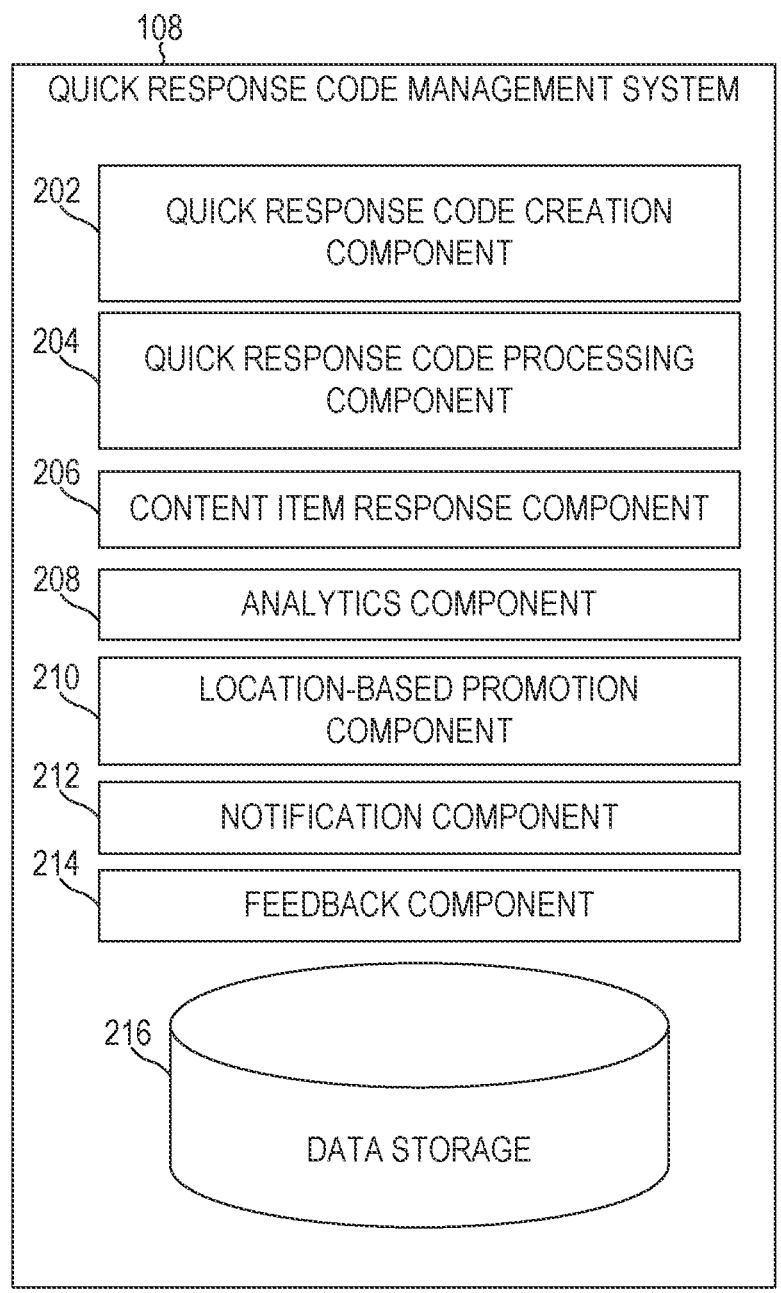
FIG. 2 is a block diagram of a QR code management system, according to some example embodiments.

FIG. 2 is a block diagram of a QR code management system 108, according to some example embodiments. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by the QR code management system 108 to facilitate additional functionality that is not specifically described herein. Furthermore, the various functional modules depicted in FIG. 2 may reside on a single computing device or may be distributed across several computing devices in various arrangements such as those used in cloud-based architectures.

As shown, the QR code management system 108 includes a QR code creation component 202, a QR code processing component 204, a content item response component 206, an analytics component 208, a location-based promotion component 210, a notification component 212, a feedback component 214, and a data storage 216.

The QR code creation component 202 provides functionality enabling users to generate geofence based QR codes. A geofence based QR code is a machine-readable code that can be embedded with data, such as a content link that allows for the access of the digital content.

The QR code creation component 202 provides a QR creation user interface that enables customers to generate geofence based QR codes for use by the customer to distribute digital content. The QR creation user interface may include user interface elements, such as buttons and textboxes, that allow a customer to provide data to be associated with a new QR code. For example, the QR creation user interface enables users to enter geofence data, describing the geographical regions where the geofence based QR code is accessible. The data may also include digital content and/or a content link for accessing digital content that the customer would like to distribute through use of the geofence based QR code. For example, the customer may provide a content link such as a URL pointing to an internee accessible resource where the digital content is store or digital content such as a digital coupon, marketing announcement, and the like. In this way, the QR code creation user interface allows customers to generate personalized geofence based QR codes for distributing digital content.

The QR code creation component 202 generates a geofence based QR code based on the data provided via the user interface. For example, the QR code creation component 202 generates a geofence based QR code that is embedded with data provided by the customer via the QR code creation user interface, such as the geofence data defining the specific geographical boundary in which the geofence based QR code can be accessed and a content link to access digital content. The geofence data embedded in the geofence based QR code allows for access to the content link and associated digital content to be limited to users located within the geographic region defined by the geofence data. The embedded information in the generated QR codes, will therefore restrict access to the content link and associated digital content to a user that is located outside of the defined geographical region.

The QR code creation component 202 returns the generated QR code to the customer. For example, the QR code creation component 202 may return a generated QR code to a customer in a digital format, such as via email, presented within a user interface on a client device 102, 104. In another example, the QR code creation component 202 may provide the geofence based QR code to a customer in a physical format, such as by causing the geofence based. QR code to be printed and mailed to the customer. A customer may make the geofence based QR code available at a physical location of their choosing to distribute the associated digital content.

The QR code creation component 202 may store the data provided from the customer system 106 in the data storage 216, where it may be accessed by the other components of the QR code management system 108. The QR code creation component 202 may associate the stored data with an identifier for the customer from which the data was provided.

The QR code processing component 204 facilitates processing of geofence based QR codes generated by the QR code management system 108. For example, the QR code processing component 204 provides functionality associated with user scanning a geofence based QR code to access the associated digital content. Accordingly, the functionality of the QR code processing component 204 may be at least partially implemented at a client device 102, 104. For example, an instance of the QR code processing component 204 may be installed and executing on a client device 102, 104 of a user to allow for processing of a geofence based QR code.

A user may use a client device 102, 104 to scan a geofence based QR code. The QR code processing component 204 extracts the geofence data and content link embedded in the geofence based QR code and accessed location data describing the geographic location of the client device 102, 104. For example, the QR code processing component 204 may access location data generated using a Global Positioning System (GPS) of the client device 102, 104. In some embodiments, a user of the client device 102, 104 may enable the QR code processing component 204 to automatically access the location data, such as by selecting permission setting associated with the QR code processing component 204. Alternatively, the QR code processing component 204 may request permission to access the location data, such as by cause presentation of a request for the location data on a display of the client device 102, 104. The user may accept or deny the request.

The QR code processing component 204 uses the location data to determine whether the client device 102, 104 is within the geographic region defined by the geofence data extracted from the geofence based QR code. If the QR code processing component 204 determines that the client device 102, 104 is within the geographic region, the QR code processing component 204 causes presentation of the content link extracted geofence based QR code on the display of the client device 102, 104, thereby allowing a user to access the corresponding digital content. Alternatively, if the QR code processing component 204 determines that the client device 102, 104 is outside of the geographic region, the QR code processing component 204 does not present the content link on the display of the client device 102, 104. Optionally, the QR code processing component 204 may also present an error on the display of the client device 102, 104. Accordingly, the content link embedded in the geofence based QR code can only be accessed when the client device 102, 104 used to scan the geofence based QR code is located within the geographic region defined by the geofence data.

The content link allows a user to access the digital content corresponding to the geofence based QR code. For example, selection of the content link causes the client device 102, 104 to generate a request directed to a location associated with the content link where the digital content is stored. The digital content may be returned to the client device 102, 104 as a result of the request, where it is then presented to the user. For example, the digital content may be presented on the display of the client device 102, 104.

The content item response component 206 provides a user with a digital content associated with a geofence based QR code. For example, the content item response component 206 receives a request from the client device 102, 104 as a result of the user selecting the content link extracted from the geofence QR code. The request is directed to the location defined by the content link, which in some embodiments may be a location managed by the QR code management system 108. These requests are received by the content item response component 206, which processes the request and returns the corresponding digital content item to the client device 102, 104 from which the request was received.

The digital content associated with a content link may be static or dynamic. A static digital content item is a digital content item that has been pre-generated and stored to be returned in response to requests associated with the geofence based QR code. That is, the digital content item is not generated or personalized per request. In this type of embodiment, the content item response component 206 accesses the stored digital content item and returns it to the requesting client device 102, 104.

Alternatively, a dynamic digital content item is generated per request. For example, the dynamic digital content item may be generated based on specified data associated with the requesting user, time, etc., to provide a customized digital content item. In this type of embodiment, the content item response component 206 may access a set of instructions that dictate how the digital content item is to be generated. For example, the set of instructions may dictate the type of data to access, how the data should be arranged in the digital content item, and the like. In some embodiments, a dynamic digital content item may be generated based on profile data associated with the user of the requesting client device 102, 104. For example, the content item response component 206 may identify the user based on the requesting client device 102, 104 and/or data included in the request received from the client device 102, 104. The profile data may contain any of a variety of types of data associated with a user, such as a preferred clothing style, shopping habits, pricing preferences, and/or other shopping behaviors. Generating a digital content item based on profile data provides for personalized digital content that is relevant to the receiving user.

The analytics component 208 manages storing and updating profile data associated with users. The profile data may include data that describes users and their actions. For example, the profile data may include demographic data describing a user, such as a user's name, address, gender, occupation, and the like. The profile data may also include interaction data describing actions performed by the user, such as the user's purchase history, store visits, accessed content links, traveled geographic regions and other data describing a user's shopping interactions associated with the client device.

The analytics component 208 updates the profile data based on geofence based QR codes scanned by the user. For example, the profile data may be updated to reflect the geographic location associated with the geofence based QR code, the time at which the geofence based QR code was scanned, and the like. The profile data is stored in the data storage 216. Accordingly, the analytics component 208 access the data storage 216 to update the profile data. The analytics component 208 may update the profile data to reflect each geofence based QR code scanned by a user. The analytics component 208 may identify the scanned QR code by communicating with the QR code processing component 204. For example, The QR code processing component 204 may communicate information about the geofence data and content link to the analytics component 208, to enable the analytics component 208 to update the profile data of the user accordingly.

The location-based promotion component 210 provides location-based promotions to users. A location-based promotion is a promotion selected based on a location history of a user. A user's location history identifies geographic locations visited by the user. A user's location history may be determined based on previous geofence based QR codes accessed by the user. For example, the location-based promotion component 210 determines the location history based on profile data associated with the user that is stored in the data storage 216.

The location-based promotion component 210 uses the location history to determine a geographic region associated with the user. The geographic region may indicate a geographic region in which the user commonly travels or is currently within based on locations visited by the user. For example, the location-based promotion component 210 determines the traveling behavior of a user based on the location history of the user and determines a geographic region that encompasses locations in which the user commonly travels or is withing.

The location-based promotion component 210 use the geographic location to identify location-based promotions for retail locations that fall within the geographic region. For example, the location-based promotion component 210 may identify retail locations within the determined geographic region and determine whether the retail locations are offering promotions. The location-based promotion component 210 may select a promotion being offered by one of the identified retail locations to provide to the user. The location-based promotion component 210 may transmit the selected promotion to the user's client device 102, 104 where it may be presented on the display of a client device 102, 104.

The notification component 212 provides notifications to customers based on geofence based QR codes. For example, the notification may indicate that a user has scanned a geofence based QR code allocated to the customer, as well as provides the customer with data relating to the user.

The notification component 212 receives an input indicating that a user has used a client device 102, 104 to scan a geofence based QR code. The notification component 212 uses data included in the input, such as data identifying the client device 102, 104 used to scan the geofence based QR code and/or a unique identifier associated with the user, to access profile data associated with the user. For example, the notification component 212 accesses the profile data form the data storage 216. The notification component 212 also accesses contact information associated with the scanned geofence based QR code. The contact information may identify a destination for the notification, such as a phone number, email address, and the like. The notification component formulates a notification based on the accessed profile data. For example, the notification may identify the user that scanned the geofence based QR code, the user's customer value level, the user's shopping preferences, and the like. The notification may also include data identifying the scanned geofence based QR code and/or the time at which the geofence based QR code was scanned, The notification component 212 transmits the notification to the destination associated with the contact information. The notification provides the customer with a notification that the user is within the geographic region associated with the geofence based QR code, as well as information that the customer may utilize to interact with the user.

The feedback component 214 facilitates gathering feedback from users that have scanned geofence based QR codes. For example, the feedback component transmits a feedback request to a client device 102, 104 that scanned a geofence based QR code. The feedback request prompts the user to provide information pertaining to a user's store visit experience. The feedback component 214 uses the received information to generate feedback data for a customer associated with the geofence based QR code. The feedback data may include the information provided by the user as well as incorporate the specific time in which the user scanned the geofence based QR code and the geofence section within the store.

In some embodiments, the feedback component 214 transmits a feedback request to the client device 102, 104 after a pre-defined time has elapses after the user has scanned the geofence based QR code. For example, the feedback request may be transmitted a few hours later or the subsequent day to avoid interrupting the user's shopping experience. Alternatively, the feedback component 214 may transmit a feedback request to the client device 102, 104 after the associated client device 102, 104 scans the geofence based QR code to obtain feedback in real-time or near real-time, to get a more accurate data of the user's experience.

The feedback component 214 may provide the feedback data to a computing device associated with the scanned geofence based QR code or store the feedback data in the data storage 216. The feedback data helps customers gather data from users visiting the customer's store, to provide a better understanding of store purchases and visits to optimize services.

Figure 3:
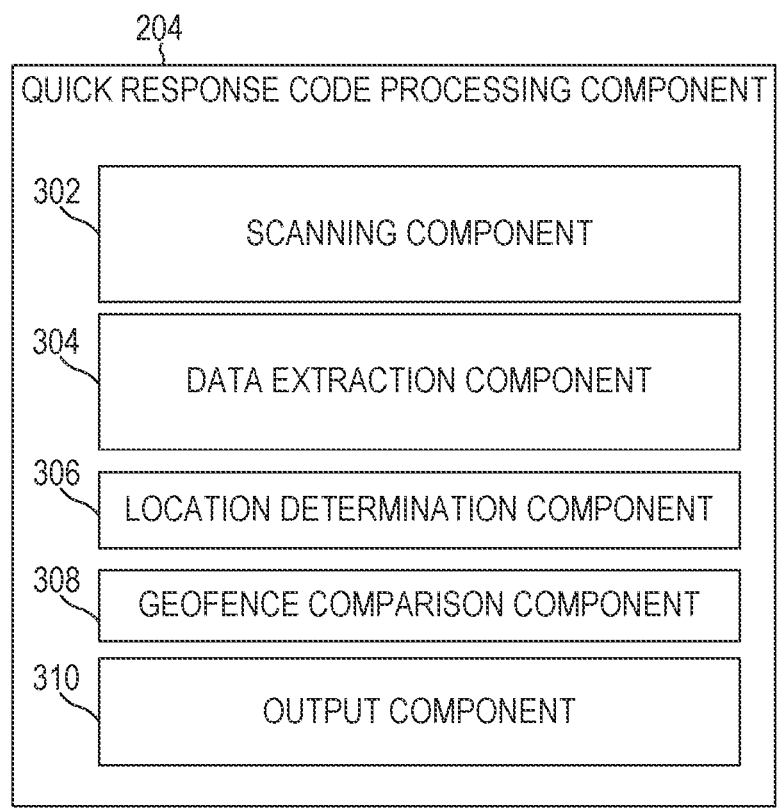
FIG. 3 is a block diagram of a QR code processing component, according to some example embodiments.

FIG. 3 is a block diagram of a QR code processing component 204, according to some example embodiments. To avoid obscuring the inventive subject matter with unnecessary detail, various functional components (e.g., modules) that are not germane to conveying an understanding of the inventive subject matter have been omitted from FIG. 3. However, a skilled artisan will readily recognize that various additional functional components may be supported by the QR code processing component 204 to facilitate additional functionality that is not specifically described herein. Furthermore, the various functional modules depicted in FIG. 3 may reside on a single computing device or may be distributed across several computing devices in various arrangements such as those used in cloud-based architectures.

As shown, the QR code processing component 204 includes a scanning component 302, a data extraction component 304, a location determination component 306, a geofence comparison component 308, and an output component 310.

The scanning component 302 facilitates scanning a geofence based QR code. For example, the scanning component 302 may utilize an optical sensor, such as a camera to capture an image of the geofence based QR code. The scanning component 302 may provide the captured image to the other components of the QR code processing component 204.

In some embodiments, the scanning component 302 verifies that the geofence based QR code is scanned properly. For example, the scanning component 302 ensures that the image captures the entirety of the geofence based QR. In this type of embodiment, the scanning component 302 may confirm that the geofence based QR code was scanned properly prior to providing the captured image of the geofence based QR code to the other components of the QR code processing component 204. For example, the scanning component 302 may prompt a user to rescan the geofence based QR code if the geofence based QR code is determined to have not been scanned properly.

The data extraction component 304 extracts embedded data from the geofence QR code. For example, the data extraction component 304 accesses the image of the geofence based QR code captured by the scanning component 302 and extracts data embedded in the geofence based QR code, such as geofence data and a content link. The geofence data defines the specific geographical boundary in which the geofence based QR code can be used to access digital content. The content link provides access to the digital content associated with the geofence based QR code.

The location determination component 306 accesses location data from the client device 102, 104. The location data describes the geographic location of the client device 102, 104 used to scan the geofence based QR code. For example, the location determination component 306 may access location data generated using a GPS of the client device 102, 104.

In some embodiments, a user of the client device 102, 104 may enable location determination component 306 to automatically access the location data, such as by selecting permission setting associated with the location determination component 306. Alternatively, the location determination component 306 may request permission to access the location data, such as by causing presentation of a request for the location data on a display of the client device 102, 104. The user may accept or deny the request.

The geofence comparison component 308 determines whether the geographic location of a client device 102, 104 used to scan a geofence based QR code is within the geographic region defined by the geofence data extracted from the geofence based QR code. For example, the geofence comparison component 308 uses the location data accessed by the location determination component 306 to determine the geographic location of the client device 102, 104, and the geofence data extracted from the geofence QR code to determine the geographic region in which the geofence based QR code may be used. The geofence comparison component 308 then determines whether the geographic location of the client device 102, 104 falls within the geographic region in which the geofence based QR code may be used. The geofence comparison component 308 may provide an output to the output component 310 indicating whether the geographic location of the client device 102, 104 falls within the geographic region defined by the geofence data extracted from the geofence based QR code.

The output component 310 causes a presentation based on the output received from the geofence comparison component 308. For example, if the geographic location of the client device 102, 104 is within the geographic region defined by the geofence data, the output component 310 causes presentation of the content link extracted geofence based QR code on the display of the client device 102, 104.

Causing presentation of the content link allows a user of the client device 102, 104 to access the corresponding digital content. For example, a user may select the presented content link to access the corresponding digital content.

Alternatively, if the geographic location of the client device 102, 104 is not within the geographic region defined by the geofence data (e.g., the client device 102, 104 is outside of the geographic region defined by the geofence data) the output component 310 may present an error on the display of the client device 102, 104. For example, the error may indicate that the client device 102, 104 is not within the proper geographic region to access the digital content. In some embodiments, the output component 310 may not cause a presentation if the geographic location of the client device 102, 104 is not within the geographic region defined by the geofence data.

Figure 4:
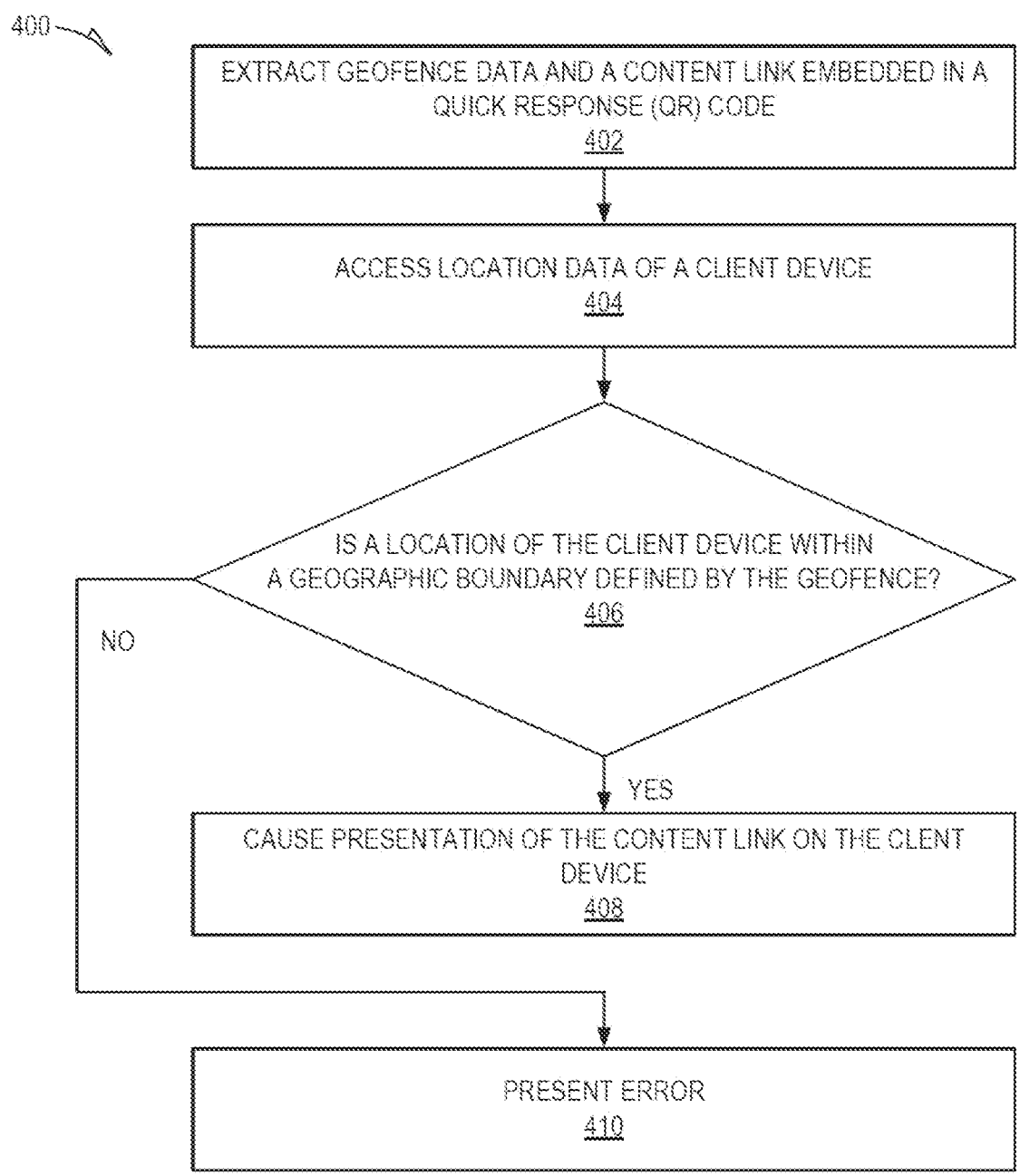
FIG. 4 is flowchart showing a method for processing a request associated with a geofence based QR code, according to some example embodiments.

FIG. 4 is a flowchart showing a method for processing a request associated with a geofence based QR code, according to some example embodiments. The method 400 may be embodied in computer readable instructions for execution by one or more processors such that the operations of the method 400 may be performed in part or in whole by the QR code management system 108; accordingly, the method 400 is described below by way of example with reference thereto. However, it shall be appreciated that at least some of the operations of the method 400 may be deployed on various other hardware configurations and the method 400 is not intended to be limited to the QR code management system 108.

At operation 402, the data extraction component 304 extracts geofence data and a content link embedded in a geofence based QR code. For example, the data extraction component 304 accesses the image of the geofence based QR code captured by the scanning component 302 and extracts data embedded in the geofence based QR code, such as the geofence data and the content link. The geofence data defines the specific geographical boundary in which the geofence based QR code can be used to access digital content. The content link provides access to the digital content associated with the geofence based QR code.

At operation 404, the location determination component 306 accesses location data from the client device 102, 104. The location data describes the geographic location of the client device 102, 104 used to scan the geofence based QR code. For example, the location determination component 306 may access location data generated using a GPS of the client device 102, 104.

In some embodiments, a user of the client device 102, 104 may enable the location determination component 306 to automatically access the location data, such as by selecting permission settings associated with the location determination component 306. Alternatively, the location determination component 306 may request permission to access the location data, such as by causing presentation of a request for the location data on a display of the client device 102, 104. The user may accept or deny the request.

At operation 406, the geofence comparison component 308 determines whether the geographic location of a client device 102, 104 used to scan a geofence based QR code is within the geographic region defined by the geofence data extracted from the geofence based QR code. For example, the geofence comparison component 308 uses the location data accessed by the location determination component 306 to determine the geographic location of the client device 102, 104, and the geofence data extracted from the geofence QR code to determine the geographic region in which the geofence based QR code may be used. The geofence comparison component 308 then determines whether the geographic location of the client device 102, 104 falls within the geographic region in which the geofence based QR code may be used. The geofence comparison component 308 may provide an output to the output component 310 indicating whether the geographic location of the client device 102, 104 falls within the geographic region defined by the geofence data extracted from the geofence based QR code.

If the geofence comparison component 308 determines the geographic location of a client device 102, 104 used to scan a geofence based QR code is within the geographic region defined by the geofence data extracted from the geofence based QR code, then the method proceeds to operation 408. At operation 408, the output component 310 causes presentation of the content link on the client device 102, 104. For example, the output component 310 causes presentation of the content link extracted from the geofence based QR code on the display of the client device 102, 104. Causing presentation of the content link allows a user of the client device 102, 104 to access the corresponding digital content. For example, a user may select the presented content link to access the corresponding digital content.

Alternatively, if at operation 406 the geofence comparison component 308 determines the geographic location of a client device 102, 104 used to scan a geofence based QR code is not within the geographic region defined by the geofence data extracted from the geofence based QR code, then the method proceeds to operation 410. At operation 410, the output component 310 presents an error. For example, the output component 310 may present the error on the display of the client device 102, 104. The error may indicate that the client device 102, 104 is not within the proper geographic region to access the digital content. In some embodiments, the output component 310 may not cause a presentation if the geographic location of the client device 102, 104 is not within the geographic region defined by the geofence data.

Figure 5:
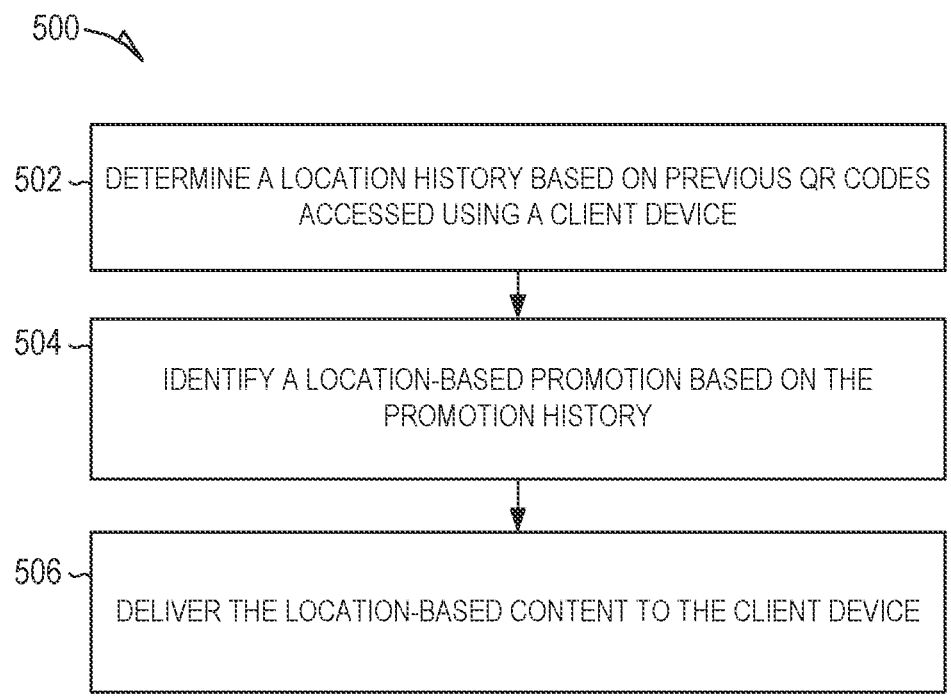
FIG. 5 is a flowchart showing a method for delivering location-based promotions, according to some example embodiments.

FIG. 5 is a flowchart showing a method 500 for delivering location-based promotions, according to some example embodiments, The method 500 may be embodied in computer readable instructions for execution by one or more processors such that the operations of the method 500 may be performed in part or in whole by the QR code management system 108; accordingly, the method 500 is described below by way of example with reference thereto. However, it shall be appreciated that at least some of the operations of the method 500 may be deployed on various other hardware configurations and the method 500 is not intended to be limited to the QR code management system 108.

At operation 502, the location-based promotion component 210 determines a location history based on previous QR codes accessed using a client device 102, 104. A location-based promotion is a promotion selected based on a location history of a user. A user's location history identifies geographic locations visited by the user. A user's location history may be determined based on previous geofence based QR codes accessed by the user. For example, the location-based promotion component 210 determines the location history based on profile data associated with the user that is stored in the data storage 216.

At operation 504, the location-based promotion component 210 may identify a location-based promotion based on the location history. For example, the location-based promotion component 210 may identify retail locations within the geographic locations visited by the user and determine whether the retail locations are offering promotions. The location-based promotion component 210 may select a promotion being offered by one of the identified retail locations to provide to the user.

At operation 506, the location-based promotion component 210 delivers the location-based content to the client device 102, 104. The location-based promotion component 210 may transmit the selected promotion to the user's client device 102, 104 where it may be presented on the display of a client device 102, 104.

Figure 6:
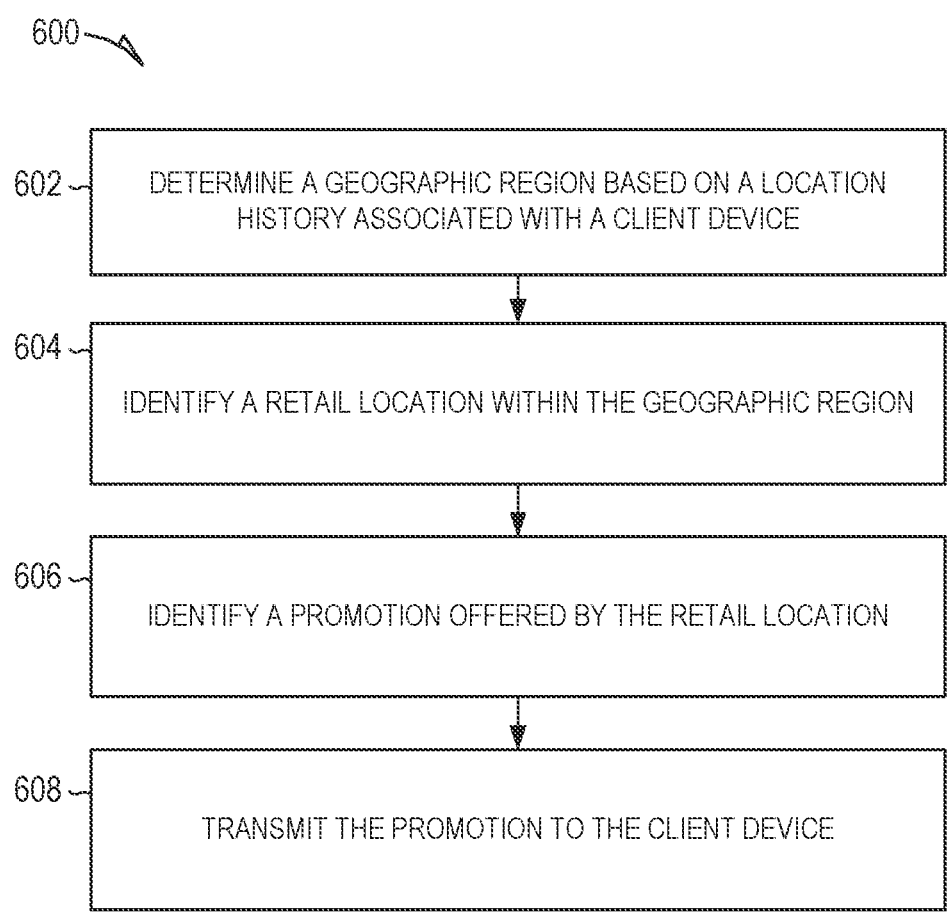
FIG. 6 is a flowchart showing a method for identifying a location-based promotion, according to some example embodiments.

FIG. 6 is a flowchart showing a method 600 for identifying a location-based promotion, according to some example embodiments. The method 600 may be embodied in computer readable instructions for execution by one or more processors such that the operations of the method 600 may be performed in part or in whole by the QR code management system 108; accordingly, the method 600 is described below by way of example with reference thereto. However, it shall be appreciated that at least some of the operations of the method 600 may be deployed on various other hardware configurations and the method 600 is not intended to be limited to the QR code management system 108.

At operation 602, the location-based promotion component 210 determines a geographic region based on a location history associated with the client device 102, 104. The geographic region may indicate a geographic region in which the user commonly travels or is currently within based on locations visited by the user. For example, the location-based promotion component 210 determines the traveling behavior of a user based on the location history of the user and determines a geographic region that encompasses locations in which the user commonly travels or is withing.

At operation 604, the location-based promotion component 210 may identify a retail location within the geographic region. For example, the location-based promotion component 210 may identify retail locations within the determined geographic region and determine whether the retail locations are offering promotions.

At operation 606, the location-based promotion component 210 identifies a promotion offered by the retail location. The location-based promotion component 210 may select a promotion being offered by one of the identified retail locations to provide to the user.

At operation 608, the location-based promotion component 210 transmits the promotion to the client device. The location-based promotion component 210 may transmit the selected promotion to the user's client device 102, 104 where it may be presented on the display of a client device 102, 104.

Figure 7:
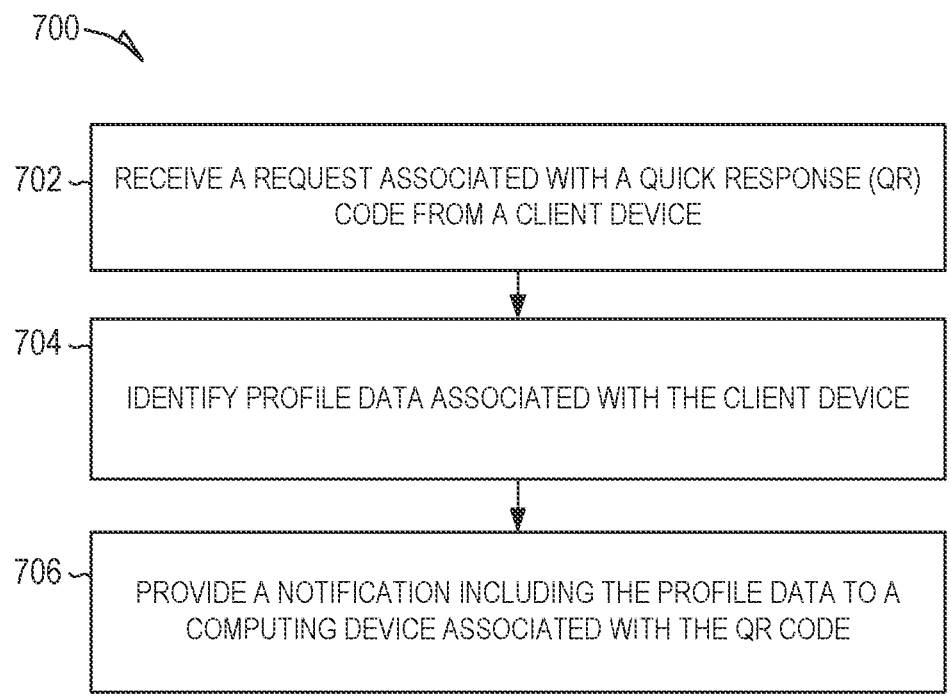
FIG. 7 is a flowchart showing a method for providing a notification based on a scanned geofence based QR code, according to some example embodiments.

FIG. 7 is a flowchart showing a method 700 for providing a notification based on a scanned geofence based QR code, according to some example embodiments. The method 700 may be embodied in computer readable instructions for execution by one or more processors such that the operations of the method 700 may be performed in part or in whole by the QR code management system 108; accordingly, the method 700 is described below by way of example with reference thereto. However, it shall be appreciated that at least some of the operations of the method 700 may be deployed on various other hardware configurations and the method 700 is not intended to be limited to the QR code management system 108.

At operation 702, the notification component 212 receives a request associated with a geofence based QR code from a client device 102, 104. The request may include data identifying the client device 102, 104 used to scan the geofence based. QR code and/or a unique identifier associated with the user associated with the client device 102, 104.

At operation 704, the notification component 212 identifies profile data associated with the client device. The notification component 212 uses data included in the request, such as data identifying the client device 102, 104 used to scan the geofence based QR code and/or a unique identifier associated with the user, to access profile data associated with the user. The notification component 212 accesses the profile data from the data storage 216.

At operation 706, the notification component 212 provides a notification including the profile data to a computing device associated with the QR code. The notification component 212 accesses contact information associated with the scanned geofence based QR code. The contact information may identify a destination for the notification, such as a phone number, email address, and the like. The notification component formulates a notification based on the accessed profile data. For example, the notification may identify the user that scanned the geofence based QR code, the user's customer value level, the user's shopping preferences, and the like. The notification may also include data identifying the scanned geofence based. QR code and/or the time at which the geofence based. QR code was scanned. The notification component 212 transmits the notification to the destination associated with the contact information. The notification provides the customer with a notification that the user is within the geographic region associated with the geofence based QR code, as well as information that the customer may utilize to interact with the user.

Figure 8:
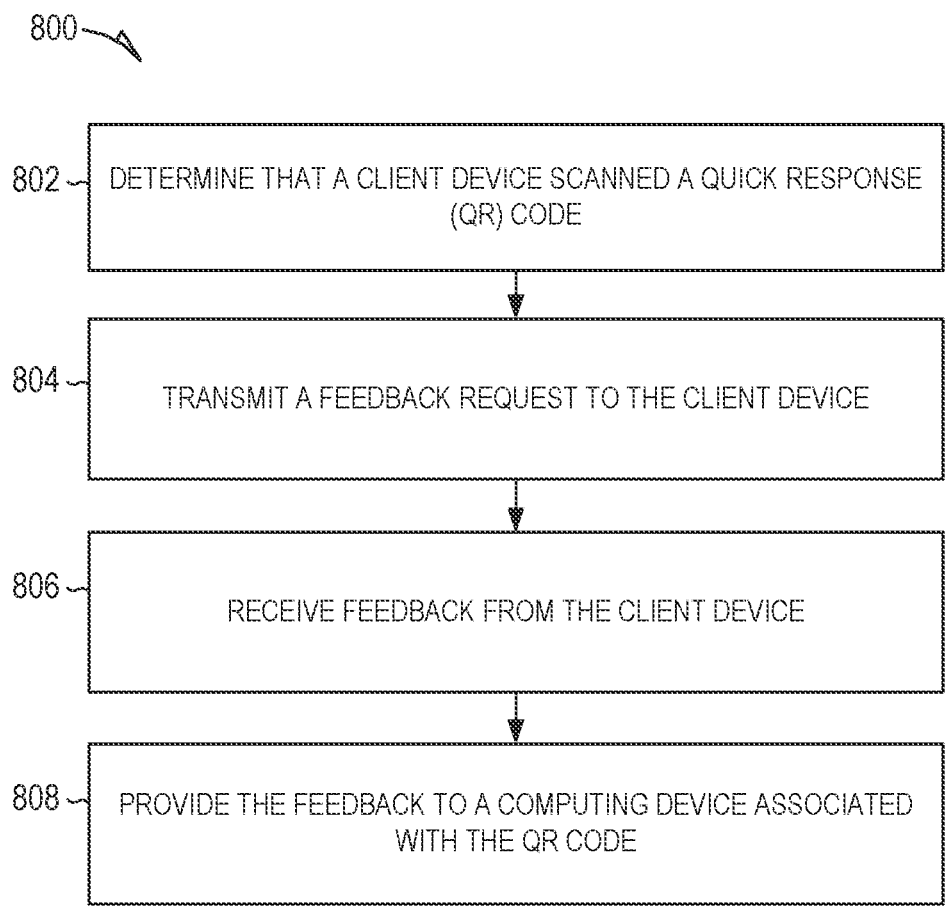
FIG. 8 is a flowchart showing a method for transmitting a feedback request based on a scanned geofence based QR code, according to some example embodiments.

FIG. 8 is a flowchart showing a method 800 for transmitting a feedback request based on a scanned geofence based QR code, according to some example embodiments. The method 800 may be embodied in computer readable instructions for execution by one or more processors such that the operations of the method 800 may be performed in part or in whole by the QR code management system 108; accordingly, the method 800 is described below by way of example with reference thereto. However, it shall be appreciated that at least some of the operations of the method 800 may be deployed on various other hardware configurations and the method 800 is not intended to be limited to the QR code management system 108.

At operation 802, the feedback component 214 determines that a client device 102, 104 scanned a QR code.

At operation 804, the feedback component 214 transmits a feedback request to the client device 102, 104. The feedback request prompts the user to provide information pertaining to a user's store visit experience. For example, the feedback request may be transmitted a few hours later or the subsequent day to avoid interrupting the user's shopping experience, Alternatively, the feedback component 214 may transmit a feedback request to the client device 102, 104 after the associated client device 102, 104 scans the geofence based QR code to obtain feedback in real-time or near real-time, to get a more accurate data of the user's experience.

At operation 806, the feedback component 214 receives feedback from the client device 102, 104. The feedback from the client device 102, 104 may include information pertaining to the user's store visit experience. The feedback component 214 uses the received information to generate feedback data for a customer associated with the geofence based QR code. The feedback data may include the information provided by the user as well as incorporate the specific time in which the user scanned the geofence based QR code and the geofence section within the store.

At operation 808, the feedback component 214 provides the feedback to a computing device associated with the QR code. The feedback data helps customers gather data from users visiting the customer's store, to provide a better understanding of store purchases and visits to optimize services.

Software Architecture

Figure 9:
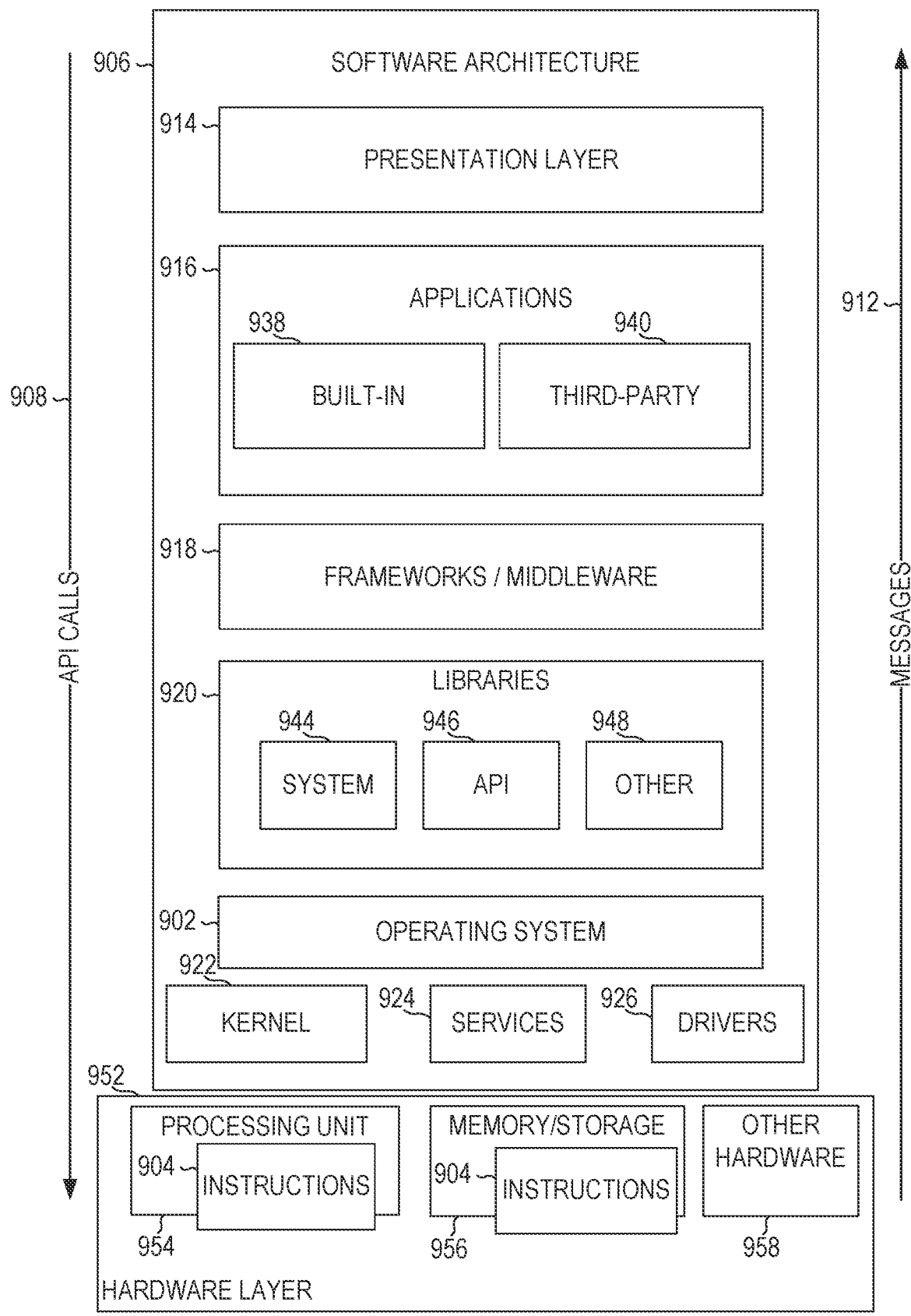
FIG. 9 is a block diagram illustrating components of a machine, according to some example embodiments, able to read instructions from a machine-readable medium (e.g., a machine-readable storage medium) and perform any one or more of the methodologies discussed herein.

FIG. 9 is a block diagram illustrating an example software architecture 906, which may be used in conjunction with various hardware architectures herein described. FIG. 9 is a non-limiting example of a software architecture 906 and it will be appreciated that many other architectures may be implemented to facilitate the functionality described herein. The software architecture 906 may execute on hardware such as machine 1000 of FIG. 10 that includes, among other things, processors 1004, memory 1014, and (input/output) I/O components 1018. A representative hardware layer 952 is illustrated and can represent, for example, the machine 1000 of FIG. 10. The representative hardware layer 952 includes a processing unit 954 having associated executable instructions 904. Executable instructions 904 represent the executable instructions of the software architecture 906, including implementation of the methods, components, and so forth described herein. The representative hardware layer 952 also includes memory and/or storage modules 956, which also have executable instructions 904. The representative hardware layer 952 may also comprise other hardware 958.

In the example architecture of FIG. 9, the software architecture 906 may be conceptualized as a stack of layers where each layer provides particular functionality. For example, the software architecture 906 may include layers such as an operating system 902, libraries 920, frameworks/middleware 918, applications 916, and a presentation layer 914. Operationally, the applications 916 and/or other components within the layers may invoke application programming interface (API) calls 908 through the software stack and receive a response such as messages 912 in response to the API calls 908. The layers illustrated are representative in nature and not all software architectures have all layers. For example, some mobile or special purpose operating systems may not provide a frameworks/middleware 918, while others may provide such a layer. Other software architectures may include additional or different layers.

The operating system 902 may manage hardware resources and provide common services. The operating system 902 may include, for example, a kernel 922, services 924, and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 920 provide a common infrastructure that is used by the applications 916 and/or other components and/or layers. The libraries 920 provide functionality that allows other software components to perform tasks in an easier fashion than to interface directly with the underlying operating system 902 functionality (e.g., kernel 922, services 924, and/or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e ., libraries to support presentation and manipulation of various media format such as MPEG4, H.264, MP3, AAC, AMR, PG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 (also sometimes referred to as middleware) provide a higher-level common infrastructure that may be used by the applications 916 and/or other software components/modules. For example, the frameworks/middleware 918 may provide various graphical user interface (GUI) functions, high-level resource management, high-level location services, and so forth. The frameworks/middleware 918 may provide a broad spectrum of other APIs that may be used by the applications 916 and/or other software components/modules, some of which may be specific to a particular operating system 902 or platform.

The applications 916 include built-in applications 938 and/or third-party applications 940. Examples of representative built-in applications 938 may include, but are not limited to, a contacts application, a browser application, a book reader application, a location application, a media application, a messaging application, and/or a game application. Third-party applications 940 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 940 may invoke the API calls 908 provided by the mobile operating system (such as operating system 902) to facilitate functionality described herein.

The applications 916 may use built in operating system functions (e.g., kernel 922, services 924, and/or drivers 926), libraries 920, and frameworks/middleware 918 to create UIs to interact with users of the system. Alternatively, or additionally, in some systems, interactions with a user may occur through a presentation layer, such as presentation layer 914. In these systems, the application/component "logic" can be separated from the aspects of the application/component that interact with a user.

Figure 10:
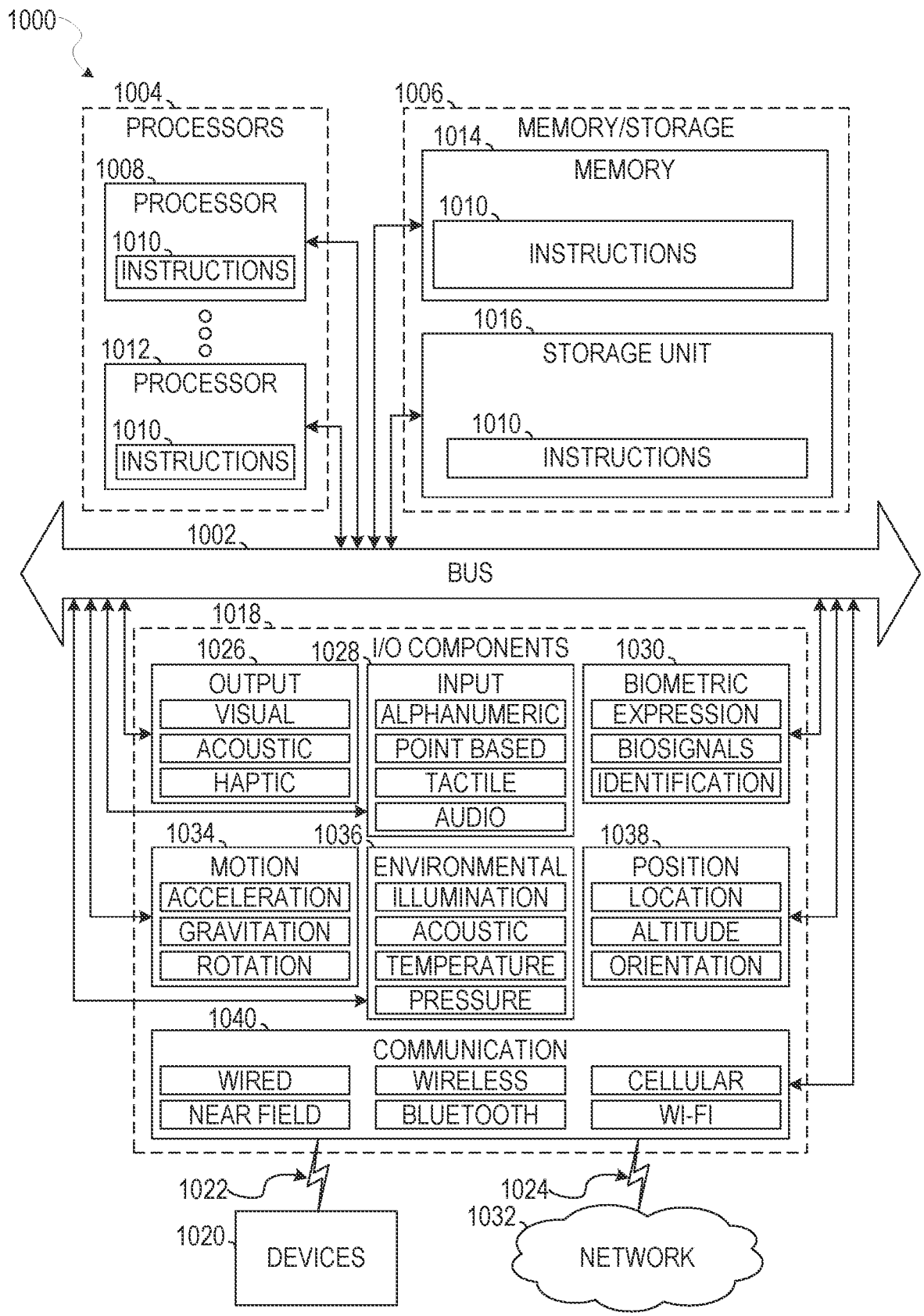
FIG. 10 is a block diagram illustrating components of a machine, according to some example embodiments, able to read instructions from a machine-readable medium a machine-readable storage medium) and perform any one or more of the methodologies discussed herein.

FIG. 10 is a block diagram illustrating components of a machine 1000, according to some example embodiments, able to read executable instructions 904 from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 1000 capable of executing the instructions 1010, sequentially or otherwise, that specify actions to be taken by machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory/storage 1006, and I/O components 1018, which may be configured to communicate with each other such as via a bus 1002. The memory/storage 1006 may include a memory 1014, such as a main memory, or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of processors 1004 are examples of machine-readable media.

The I/O components 1018 may include a wide variety of components to receive input, provide output, produce output, transmit information, exchange information, capture measurements, and so on. The specific I/O components 1018 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1018 may include many other components that are not shown in FIG. 10. The I/O components 1018 are grouped according to functionality merely for simplifying the following discussion and the grouping is in no way limiting. In various example embodiments, the I/O components 1018 may include output components 1026 and input components 1028. The output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1018 may include biometric components 1030, motion components 1034, environmental components 1036, or position components 1038 among a wide array of other components. For example, the biometric components 1030 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1034 may include acceleration sensor components (e.g., accelerometer), gravitation sensor components, rotation sensor components (e.g., gyroscope), and so forth. The environmental components 1036 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1038 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040 operable to couple the machine 1000 to a network 1032 or devices 1020 via coupling 1024 and coupling 1022, respectively. For example, the communication components 1040 may include a network interface component or other suitable device to interface with the network 1032. In further examples, communication components 1040 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1020 may be another machine or any of a wide variety of peripheral devices (e.g., a peripheral device coupled via a USB).

Moreover, the communication components 1040 may detect identifiers or include components operable to detect identifiers. For example, the communication components 1040 may include radio frequency identification (REID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040 such as location via Internet Protocol (IP) geo-location, location via Wi-Fi® signal triangulation, location via detecting a NFC beacon signal that may indicate a particular location, and so forth.

Glossary

"CARRIER SIGNAL " in this context refers to any intangible medium that is capable of storing, encoding, or carrying instructions 1010 for execution by the machine 1000, and includes digital or analog communications signals or other intangible medium to facilitate communication of such instructions 1010. Instructions 1010 may be transmitted or received over the network 1032 using a transmission medium via a network interface device and using any one of a number of well-known transfer protocols.

"CLIENT DEVICE" in this context refers to any machine 1000 that interfaces to a communications network 1032 to obtain resources from one or more server systems or other client devices 102, 104. A client device 102, 104 may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 1032.

"COMMUNICATIONS NETWORK" in this context refers to one or more portions of a network 1032 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 1032 or a portion of a network 1032 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 1010 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 1010. The term "machine-readable medium" shall also be taken to include any medium, or combination of multiple media, that is capable of storing instructions 1010 (e.g., code) for execution by a machine 1000, such that the instructions 1010, when executed by one or more processors 1004 of the machine 1000, cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 1004) may be configured by software (e.g., an application 916 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 1004 or other programmable processor 1004. Once configured by such software, hardware components become specific machines 1000 (or specific components of a machine 1000) uniquely tailored to perform the configured functions and are no longer general-purpose processors 1004. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component"(or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 1004 configured by software to become a special-purpose processor, the general-purpose processor 1004 may be configured as respectively different special-purpose processors (e.g., comprising different hardware components) at different times. Software accordingly configures a particular processor or processors 1004, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 1002) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 1004 that are temporarily configured (e.g., by software) or permanently configured to perform the relevant operations. Whether temporarily or permanently configured, such processors 1004 may constitute processor-implemented components that operate to perform one or more operations or functions described herein. As used herein, "processor-implemented component" refers to a hardware component implemented using one or more processors 1004. Similarly, the methods described herein may be at least partially processor-implemented, with a particular processor or processors 1004 being an example of hardware. For example, at least some of the operations of a method may be performed by one or more processors 1004 or processor-implemented components. Moreover, the one or more processors 1004 may also operate to support performance of the relevant operations in a "cloud computing" environment or as a "software as a service" (SaaS). For example, at least some of the operations may be performed by a group of computers (as examples of machines 1000 including processors 1004), with these operations being accessible via a network 1032 (e.g., the Internet) and via one or more appropriate interfaces (e.g., an API). The performance of certain of the operations may be distributed among the processors 1004, not only residing within a single machine 1000, but deployed across a number of machines 1000. In some example embodiments, the processors 1004 or processor-implemented components may be located in a single geographic location (e.g., within a home environment, an office environment, or a server farm). In other example embodiments, the processors 1004 or processor-implemented components may be distributed across a number of geographic locations.

"PROCESSOR" in this context refers to any circuit or virtual circuit (a physical circuit emulated by logic executing on an actual processor 1004) that manipulates data values according to control signals (e.g., "commands," "op codes," "machine code," etc.) and which produces corresponding output signals that are applied to operate a machine 1000. A processor 1004 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof A processor 1004 may further be a multi-core processor having two or more independent processors 1004 (sometimes referred to as "cores") that may execute instructions 1010 contemporaneously.

What is claimed is:

1. A method comprising:
   capturing, by a client device, an image of a Quick Response (QR) code;
   extracting, by the client device, geofence data and a content link embedded in the QR code captured in the image, the geofence data defining a geographic boundary and the content link providing an address for digital content associated with the QR code;
   determining, by the client device, whether a geographic location of the client device is within the geographic boundary defined by the geofence data; and
   in response to determining that the geographic location of the client device is within the geographic boundary defined by the geofence data, presenting, by the client device, the content link extracted from the QR code on a display of the client device, the content link presented on the display enabling a user of the client device to access the digital content associated with the QR code.

2. The method of claim 1, further comprising:
   after capturing the image of the QR code, determining location data identifying the geographic location of the client device.

3. The method of claim 1, further comprising:
   updating an analytics database based on capturing the image of the QR code, the analytics database being maintained by a QR management system and identifying QR codes accessed by client devices.

4. The method of claim 3, further comprising:
   receiving, from the QR management system, a location-based promotion, the QR system having identified the location-based promotion by:
   determining a location history of the client device based on the analytics database, the location history identifying a plurality of geographic locations visited by the client device; and
   identifying the location-based promotion based on the location history of the client device.

5. The method of claim wherein identifying the location-based promotion comprises:
   determining, based on the location history of the client device, a first geographic region in which the client device commonly travels;
   identifying a first retail location that is within the first geographic region; and
   identifying a promotion offered by the first retail location.

6. The method of claim 1, further comprising:
   capturing, by the client device, a second image of a second QR code;
   extracting, by the client device, second geofence data and a second content link from the second QR code captured in the second image, the second geofence data defining a second geographic boundary and the second content link providing an address for digital content associated with the second QR code;

determining whether an updated geographic location of the client device is within the second geographic boundary defined by the second geofence data; and in response to determining that the updated geographic location of the client device is within the second geographic boundary defined by the second geofence data, presenting, by the client device, the second content link extracted from the second QR code on the display of the client device, the second content link presented on the display enabling the user of the client device to access the digital content associated with the second QR code.

7. The method of claim 1 further comprising:

causing a user interface to be presented on a display device;

receiving, via the user interface, data to be associated with a second QR code, the data comprising second geofence data describing geographic regions in which the second QR code is accessible and a content link for accessing digital content through use of the second QR code; and generating the second QR code comprising the geofence data and the content link.

8. The method of claim 7, further comprising:

presenting the generated second QR code on the display device.

9. A client device comprising:

one or more computer processors; and one or more computer-readable mediums storing instructions that, when executed by the one or more computer processors, cause the client device to perform operations comprising:

capturing an image of a Quick Response (QR) code;

extracting geofence data and a content link embedded in the QR code captured in the image, the geofence data defining a geographic boundary and the content link providing an address for digital content associated with the QR code;

determining whether a geographic location of the client device is within the geographic boundary defined by the geofence data; and in response to determining that the geographic location of the client device is within the geographic boundary defined by the geofence data, presenting the content link extracted from the QR code on a display of the client device, the content link presented on the display enabling a user of the client device to access the digital content associated with the QR code.

10. The client device of claim 9, the operations further comprising:

after capturing the image of the QR code, determining location data identifying the geographic location of the client device.

11. The client device of claim 9, the operations further comprising:

updating an analytics database based on capturing the image of the QR code, the analytics database being maintained by a QR management system and identifying QR codes accessed by client devices.

12. The client device of claim 11, the operations further comprising:

receiving, from the QR management system, a location-based promotion, the QR system having identified the location-based promotion by:

determining a location history of the client device based on the analytics database, the location history identifying a plurality of geographic locations visited by the client device; and identifying the location-based promotion based on the location history of the client device.

13. The client device of claim 12, wherein identifying the location-based promotion comprises:

determining, based on the location history of the client device, a first geographic region in which the client device commonly travels;

identifying a first retail location that is within the first geographic region; and identifying a promotion offered by the first retail location.

14. The client device of claim 9, the operations further comprising:

accessing profile data associated with the client device; and providing a notification to a computing device associated with the QR code, the notification including the profile data.

15. The client device of claim 9, the operations further comprising:

receiving, from a QR system, a feedback request associated with the QR code; and transmitting feedback from the client device to the QR system, the QR system providing the feedback to a computing device associated with the QR code.

16. The client device of claim 9, the operations further comprising:

capturing a second image of a second QR code;

extracting second geofence data and a second content link from the second QR code captured in the second image, the second geofence data defining a second geographic boundary and the second content link providing an address for digital content associated with the second QR code;

determining whether an updated geographic location of the client device is within the second geographic boundary defined by the second geofence data; and in response to determining that the updated geographic location of the client device is within the second geographic boundary defined by the second geofence data, presenting the second content link extracted from the second QR code on the display of the client device, the second content link presented on the display enabling the user of the client device to access the digital content associated with the second QR code.

17. A non-transitory computer-readable medium storing instructions that, when executed by one or more computer processors of a client device, cause the client device to perform operations comprising:

capturing an image of a Quick Response (QR) code;

extracting geofence data and a content link embedded in the QR code captured in the image, the geofence data defining a geographic boundary and the content link providing an address for digital content associated with the QR code;

determining whether a geographic location of the client device is within the geographic boundary defined by the geofence data; and in response to determining that the geographic location of the client device is within the geographic boundary defined by the geofence data, presenting the content link extracted from the QR code on a display of the client device, the content link presented on the display enabling a user of the client device to access the digital content associated with the QR code.

18. The non-transitory computer-readable medium of claim 17, the operations further comprising:
updating an analytics database based on capturing the mage of the QR code, the analytics database being maintained by a QR management system and identifying QR codes accessed by client devices.

19. The non-transitory computer-readable medium of claim 18, the operations further comprising:
receiving, from the QR management system, a location-based promotion, the QR system having identified the location-based promotion by:
determining a location history of the client device based on the analytics database, the location history identifying a plurality of geographic locations visited by the client device; and
identifying the location-based promotion based on the location history of the client device.

20. The non-transitory computer-readable medium of claim 17, the operations further comprising:
capturing a second image of a second QR code;
extracting second geofence data and a second content link from the second QR code captured in the second image, the second geofence data defining a second geographic, boundary and the second content link providing an address for digital content associated with the second QR code;
determining whether an updated geographic location of the client device is within the second geographic boundary defined by the second geofence data; and
in response to determining that the updated geographic location of the client device is within the second geographic boundary defined by the second geofence data, presenting the second content link extracted from the second QR code on the display of the client device, the second content link presented on the display enabling the user of the client device to access the digital content associated with the second QR code.

\* \* \* \* \*